(12) United States Patent
Gravelle et al.

(10) Patent No.: US 6,233,349 B1
(45) Date of Patent: May 15, 2001

(54) APPARATA AND METHODS OF ANALYZING THE FOCAL SPOTS OF X-RAY TUBES

(75) Inventors: Stephen W. Gravelle, Mequon; Paul G. Nagy, Wauwatosa, both of WI (US)

(73) Assignee: General Electric Company, Milwaukee, WI (US)

( * ) Notice: Subject to any disclaimer, the term of this patent is extended or adjusted under 35 U.S.C. 154(b) by 0 days.

(21) Appl. No.: 08/880,097

(22) Filed: Jun. 20, 1997

(51) Int. Cl.[7] .............................. G06K 9/00; G01D 18/00
(52) U.S. Cl. ...................... 382/132; 382/255; 358/504; 378/62; 378/207
(58) Field of Search .................................. 382/100, 112, 382/132, 255, 274; 358/504; 378/62, 98, 113, 138, 207

(56) References Cited

U.S. PATENT DOCUMENTS

| | | | |
|---|---|---|---|
| 3,636,351 | * 1/1972 | Lajus | 378/171 |
| 3,851,204 | 11/1974 | Rollfinke | 378/144 |
| 4,052,640 | 10/1977 | Hueschen et al. | 378/144 |
| 4,097,793 | * 6/1978 | Shapiro et al. | 378/98 |
| 4,132,654 | * 1/1979 | Braun | 378/207 |
| 4,132,916 | 1/1979 | Hueschen et al. | 378/144 |
| 4,239,395 | * 12/1980 | Modisette | 378/207 |
| 4,777,642 | * 10/1988 | Ono | 378/138 |
| 4,829,551 | * 5/1989 | Resnick et al. | 378/131 |
| 4,953,190 | 8/1990 | Kukoleck et al. | 378/129 |
| 5,191,621 | * 3/1993 | Brok | 382/100 |
| 5,422,527 | 6/1995 | Lazzaro | 310/211 |
| 5,606,591 | * 2/1997 | Montel et al. | 378/207 |
| 5,696,804 | * 12/1997 | Ono et al. | 378/4 |
| 5,745,548 | * 4/1998 | Dobbs et al. | 378/207 |
| 5,809,106 | * 9/1998 | Kitade et al. | 378/132 |

OTHER PUBLICATIONS

New device for accurate measurement of the X-ray intensity distribution of X-ray tube focal spot (Medical Physics, vol. 2, No. 5), Sep. 1975.*

* cited by examiner

Primary Examiner—Jon Chang
Assistant Examiner—Mehrdad Dastouri
(74) Attorney, Agent, or Firm—Dewitt Ross and Stevens; Christian G. Cabou; Phyllis Y. Price

(57) ABSTRACT

An apparatus for determining the quality of X-ray tubes by analyzing filmed images of the focal spots produced by the tubes. In an exemplary embodiment of the apparatus, a slide scanner receives a filmed focal spot from an X-ray tube and scans it to produce a digital version of the focal spot. The digital focal spot is then analyzed by a personal computer to determine parameters relating to the focal spot such as its background and peak optical density, line spread function, modulation transfer function, skew, and loading. These parameters are then compared to parameter standards to determine whether the X-ray tube should be accepted or rejected under current quality standards.

8 Claims, 2 Drawing Sheets

APPARATA AND METHODS OF ANALYZING THE FOCAL SPOTS OF X-RAY TUBES

FIELD OF THE INVENTION

The invention relates generally to apparata and methods which utilize image analysis for implementation of quality control measures, and specifically to imaging apparata and methods for quality control of X-ray tubes.

DESCRIPTION OF THE PRIOR ART

In X-ray machines and related apparata (e.g., computerized axial tomography or CAT scanners), X-ray photons are produced in an X-ray tube by directing a focused electron beam from a cathode to a rotating anode. The X-ray focal spot used to produce a diagnostic image is defined by the area of electron beam impingement on the rotating anode. As the electron beam strikes the anode, X-ray photons are emitted and collimated in a beam from the X-ray tube. The object to be imaged is placed between the X-ray tube and radiographic film or other detector device so that the film intercepts X-ray photons passing through the object. Good descriptions of the general state of the art in X-ray tube structure and operation may be found in U.S. Pat. Nos. 3,851,204; 4,052,640; 4,132,916; 4,953,190; and 5,422,527.

To produce images of high quality, a stable and properly-shaped focal spot is critical. This requires that the different parts of the X-ray tube be constructed and assembled to a high degree of precision; for example, the anode must have minimal surface irregularities and minimal unbalance about its axis of rotation, the cathode must be properly shaped and oriented toward the anode, etc. At present, the best way to determine whether an X-ray tube is properly made is to place it in use and determine the integrity of its focal spot. Standardized procedures for this determination have been developed by NEMA and the IEC, and generally involve directing the photon beam through an aperture having a particular size and configuration and onto radiographic film to obtain an image of the focal spot. Technicians can then review the focal spot image, generally with the assistance of an optical loupe, to determine whether it meets desired standards relating to its size, shape, radiation intensity, etc. If the standards are not met, the tube can be refurbished or discarded and the tube manufacturing process can be reviewed to determine whether a systematic manufacturing error is occurring.

Unfortunately, this method is unreliable in some respects. While some quality standards are easy to accurately apply to the focal spot images, the manual application of certain types of quality standards to the images is inevitably tainted by the reviewer's subjective opinion of the image quality: whether the degree of film exposure at a certain area indicates a particular photon density, where the precise edges of the image are within grey zones, etc. Further, it is difficult for technicians to adjudge multiple exposures in exactly the same manner, particularly where technician fatigue is a factor. The tendency for "drift" in the standards of image review results in erroneous rejection of quality tubes and/or acceptance of defective tubes, as well as misguided review and alterations to the tube manufacturing process.

SUMMARY OF THE INVENTION

The present invention is directed to apparata and methods for automated analysis of X-ray focal spot images and application of quality standards to their X-ray tubes. A film sample bearing an image of a focal spot created by a selected X-ray tube is imaged by imaging means, e.g., a slide scanner, to transform the focal spot image into a processable signal. Processing means, such as a personal computer and associated software, receive the processable signal and analyze it to determine parameters relating to the image. The parameters relate to at least one of the image's dimensions, its shape, and its optical density, and may include such parameters as the line spread function, the modulation transfer function, the background and/or peak optical density, the skew, and the loading of the image. After the parameters are determined, they may be compared to known parameter standards. Where the determined parameters do not conform to the known parameter standards, the X-ray tube can be rejected.

The quality of an X-ray tube can be even more thoroughly analyzed by obtaining two or more film samples, each bearing an image of the focal spot of an X-ray tube wherein the samples are obtained at different times. For example, the samples can bear images of the tube's focal spot (1) when its stator is unpowered and its anode is stationary, (2) when its stator is powered and its anode is rotating, and (3) when its stator is unpowered and its anode is coasting (i.e., its stator current was just cut off). The parameters calculated for each of these images may then be compared to ascertain other operating characteristics of the tube in question. To illustrate, a comparison of the parameters for images (1) and (3) will demonstrate how any rotational imbalance in the anode affects the parameters, and a comparison of the parameters of images (2) and (3) will demonstrate how any electromagnetic leakage between the stator and anode affects the parameters. The analysis of multiple film samples in this manner may be assisted by combining the imaging means with feeding means for supplying multiple film samples to the imaging means in succession, e.g., film feeders and slide feeders.

The primary advantages of the aforementioned apparata and methods are that the subjectivity of human image analysis is eliminated, allowing for consistent review of multiple images with quantifiable repeated error, and additionally that the use of electromechanical apparata and methods allows for a savings of time and manpower. Further features and advantages of the invention will be apparent from the following detailed description of the invention in conjunction with the associated drawings.

DETAILED DESCRIPTION OF THE INVENTION

Figure 1:
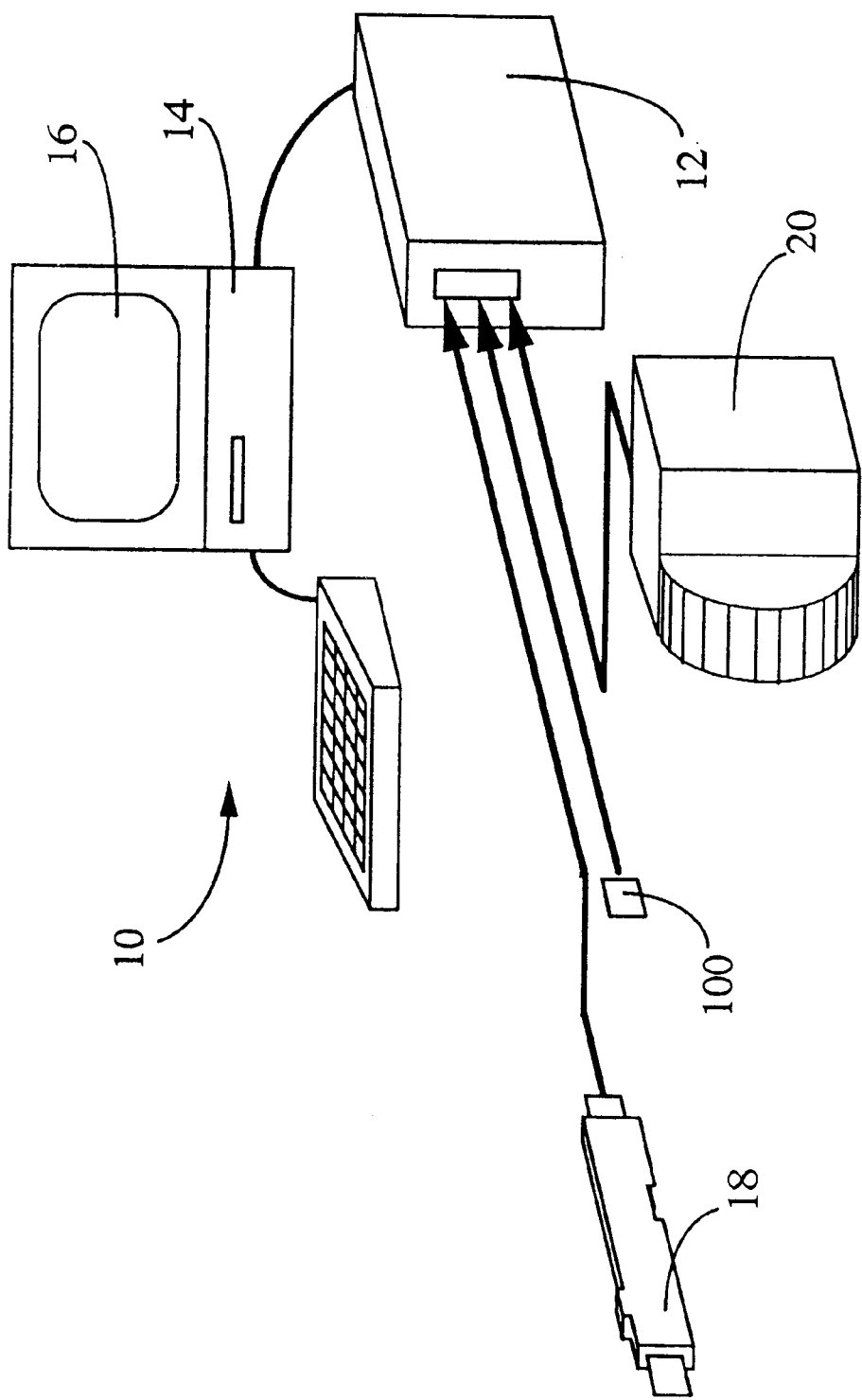
FIG. 1 is a perspective view of a preferred embodiment of an X-ray tube focal spot analysis apparatus of the present invention.

In the drawings, wherein the same or similar features of the invention are designated in all Figures with the same reference numerals, FIG. 1 illustrates a preferred embodiment of the X-ray tube focal spot analysis apparatus at the reference numeral 10. A radiographic film sample which bears an image of a focal spot obtained from a selected X-ray tube is illustrated at 100. An imaging means for transforming the focal spot image on the film sample 100 into a processable signal is provided by the apparatus at 12 in the form of a commercially available film scanner wherein the film sample 100 may be inserted and imaged.

An exemplary film scanner 12 suitable for use in the apparatus 10 is the Nikon LS-1000 slide scanner, which scans 35 mm film, whether it be in negative, print, or slide form, or in color or monochrome, with high speed and resolution to obtain an electronic version of the image.

The imaging means, e.g., the slide scanner 12, is connected to processing means for receiving and analyzing the electronic image. This processing means is preferably provided by a personal computer 14 interfaced to the slide scanner 12 and running software for providing image analysis functions. The nature of the software and the functions it provides is discussed at greater length below.

Figure 2:
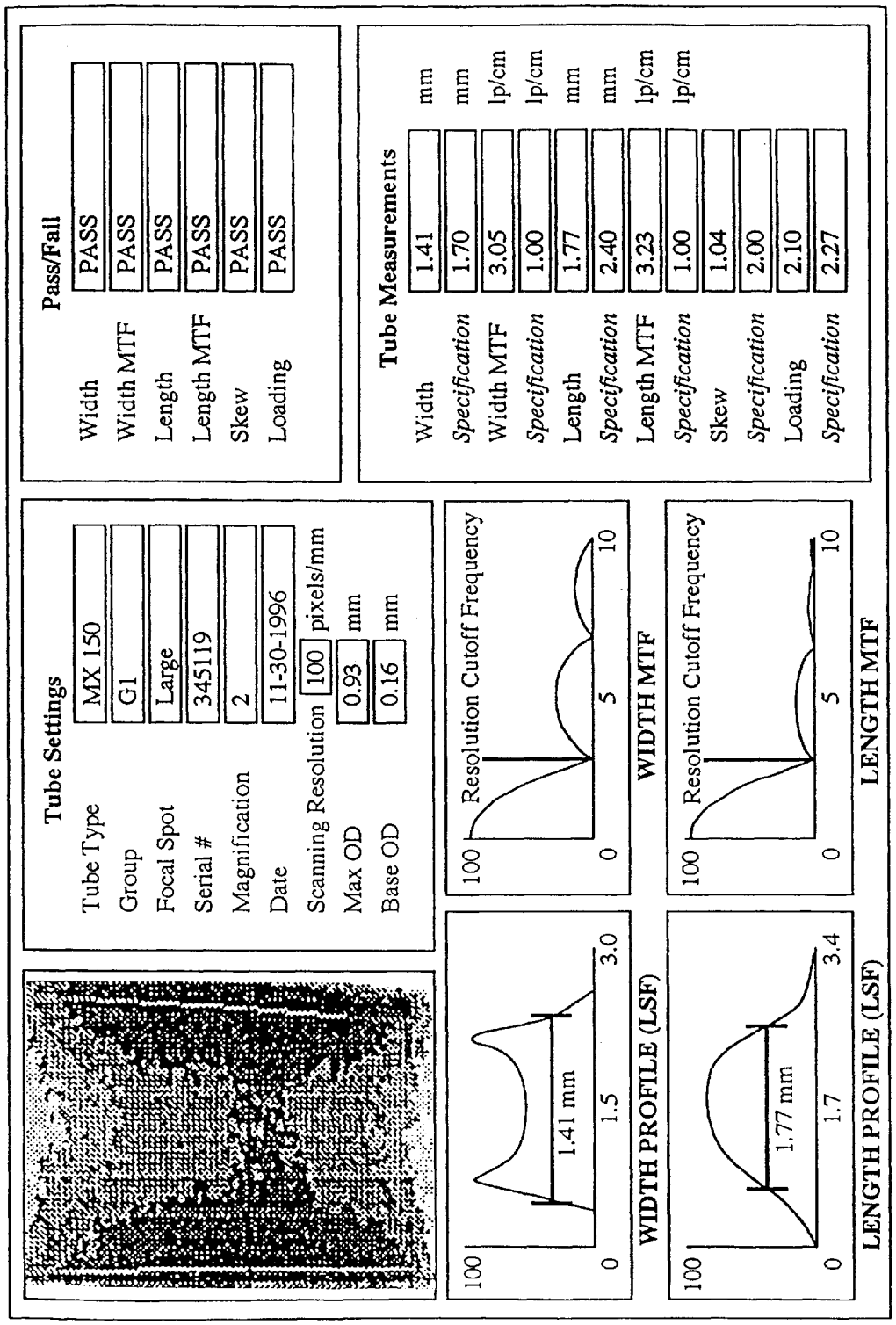
FIG. 2 is an exemplary display generated by the X-ray tube focal spot analysis apparatus of FIG. 1.

The apparatus 10 preferably also includes display means, e.g., the monitor 16, for displaying the scanned image and any other information which is necessary or desirable. An exemplary display produced by the monitor display means 16 in conjunction with the personal computer processing means 14 is illustrated in FIG. 2 with the focal spot image produced by a particular X-ray tube shown in the upper lefthand corner of the display. The other features of the display of FIG. 2 are discussed below.

As noted above, in the most preferred embodiment of the invention, the personal computer 14 runs custom software for communicating with the slide scanner 12 and analyzing the image received therefrom in order to discern a variety of parameters relating to the quality of the X-ray tube. Ideally, the personal computer 14 or other processing means should be able to discern at least such parameters as the dimensions of the image, the shape of the image, and the optical density of the image. In the preferred embodiment, the software run by the personal computer 14 determines the following parameters with respect to the image provided by the slide scanner 12:

Background Density (Base OD): A measure of the diffuse optical density of the film outside the region of the focal spot, i.e., the "noise" present in the scanned film. The units of background density are OD (optical density), which is the log base 10 ratio of the incident light intensity over the transmitted light density.

Peak density (Maximum OD): The optical density of the image at the darkest (most exposed) part of the focal spot. The peak density and background density are displayed to the user as illustrated in FIG. 2, and if their values do not meet predefined criteria, this can indicate that the film was not properly exposed and processed and that it should be re-shot to properly analyze the focal spot.

Width: The distance between the leftmost and rightmost points of the image having optical density equal to a preselected percentage of the peak density, e.g., the 50% density points. This preselected percentage therefore defines the effective lefthand and righthand boundaries of the image.

Length: The distance between the uppermost and lowermost points of the image having optical density equal to a preselected percentage of the peak density, e.g., the 20% density points. This preselected percentage therefore defines the effective uppermost and lowermost boundaries of the image.

Line Spread Function (LSF): The LSF, a measure of the density (exposure) of a region of the image versus the position of the region within the image, gives an indication of the size of the focal spot and whether the X-ray tube has the desired emission pattern. As illustrated in FIG. 2, the LSF can be determined at desired lines along the length and width dimensions, e.g., at their midpoints, and can then be displayed graphically on the monitor 16 or other display means with the length and width parameters superimposed.

Modulation Transfer Function (MTF): The MTF, a normalized Fourier transform of the LSF, measures the overall imaging capability of an instrument (here, the X-ray tube and film). An "deal" instrument has an MTF of 1 (100%), but this is impossible to achieve in reality owing to noise in the image, e.g., degradation from instrument-to-object distance, absorption of photons by the object or the photon detector, etc. The length and width of MTF are graphically illustrated in FIG. 2 to the right of the LSF.

Skew: A measure of the shape or "perpendicularity" of the focal spot, skew is the ratio of the absolute width of the focal spot to its standard width (i.e., the ratio of the x-axis distance between the leftmost and rightmost edge points on the focal spot to the x-axis distance between the left and right edge points along a horizontal axis. A perfectly rectangular focal spot has a skew of 1.0, whereas a focal spot shaped like an oblique parallelogram has skew greater than 1.0.

Loading: A measure of the electron density striking the target, equal to the product of the length of the focal spot and the square root of its width.

At present, these parameters are calculated by the computer 14 in accordance with NEMA standard XR-5 (Revision 1992) and IEC standard 336 (Revision 1993-08, 3d Edition). While it is possible to have the computer 14 or other processing means utilize an ASIC (Application Specific Integrated Circuit) chip or similar device to perform the parameter calculation and analysis, it is recommended that these functions be performed by the use of software loaded into the computer memory. This allows accommodation of other or updated parameter calculation standards by reprogramming or reconfiguring the software accordingly. The preferred software is not discussed in great detail in this disclosure because a programmer of ordinary skill, when given this disclosure and the specifications of the particular imaging means, processing means, etc. to be used in the apparatus, could rapidly produce the appropriate software with no more than routine experimentation.

Of the aforementioned parameters, the width, length, and their MTF's are considered most important under current quality standards. Thus, after the computer 14 or other processing means determines these parameters for a focal spot produced by a given X-ray tube, the parameters are compared to lower and/or upper threshold values which, if exceeded, indicate that the tube is of unacceptable quality. As shown at the right-hand side of the display of FIG. 2 in the section entitled "Tube Measurements," each parameter may be displayed alongside its quality threshold. For greatest convenience, it is then recommended that a pass/fail indication be given, as in the section of the display entitled "Pass/Fail".

Other parameters illustrated in the exemplary display of FIG. 2 are not discerned from the focal spot image, and are either provided for the convenience of the analyzing technician and/or for recordkeeping purposes. For example, apart from the "Max OD" and "Base OD," the data displayed in the various fields of the "Tube Settings" section of the display near the middle top of FIG. 2 comprise data on the X-ray tube, that data being provided by the technician or other external data source.

The data provided in the display of FIG. 2 is preferably saved in storage means associated with the processing means, such as magnetic or optical storage media provided internally or externally of the computer 14. Alternatively or additionally, the display of FIG. 2 can be provided in the form of a printout. Each filmed focal spot image can be stapled to its corresponding printout and the entire record can be retained for later use.

It is preferable that the apparatus 10 includes some means of totally or partially automating the process of feeding successive images to the slide scanner 12 (or other imaging means) and analyzing them by use of the processing means. FIG. 1 illustrates exemplary such feeding means in the form of strip film feeders 18 and slide feeders 20 for interfacing with the slide scanner 12 and successively feeding it multiple film images. Such feeders are commercially available and can be used with appropriately-programmed software to automate the process. An exemplary strip film feeder is provided with the Nikon LS-1000 slide scanner, and slide feeding can be performed by means of the Nikon auto slide feeder SF-100.

While the apparatus 10 is ideally provided in the form described above, that is, with the imaging means being provided by a slide scanner 12, the processing means being provided by a personal computer 14, and the display means being provided by a computer monitor 16, alternate components are possible. For example, an array of CCD (Charge Coupled Device) sensors can be used to image the film, and its signals can be supplied to a digital oscilloscope which includes programmable signal processing features. The appropriate algorithms for determining focal spot length/width, for converting LSF to MTF, etc. can then be utilized to display and record the desired parameters. Alternatively, scanners or digital cameras can be used to capture images of X-ray film, and these images can then be analyzed by software or application-specific analysis circuitry in the manner noted above. It is apparent that various different combinations of the imaging means, processing means, etc. described above are possible. However, use of commonly available slide scanners for the imaging means is highly recommended because they have been found to be very well suited for rapid imaging of X-ray film with minimal set-up, even though they were not contemplated to have such a use.

It is also understood that the apparatus can be used to obtain, display, and record a variety of parameters apart from or additionally to those mandated by current NEMA/IEC standards. For example, rather than merely measuring and displaying the LSF midway along the width and length dimensions, the LSF could additionally or alternatively be displayed along the entireties of both of the width and length dimensions. If desired, the width and length LSF's could then be displayed simultaneously on the display means as a contour plot (i.e., a plot of normalized density over the width and length dimensions can be displayed).

It is further understood that the apparatus can be used to obtain further diagnostic data on X-ray tubes by analyzing images taken at different times. For example, separate focal spot images may be obtained with a stationary anode; with the anode rotating and the stator powered (current on); and with the anode coasting and the stator unpowered. By analyzing the rotating anode with the stator current on, an image of the focal spot under standard operating conditions will be obtained, including any image degradation due to focal spot jitter (from anode imbalance) and electromagnetic effects from rotor/stator interaction. By analyzing the coasting anode with no stator current, the effects of rotor/stator interaction will be minimal. Finally, by analyzing the stationary anode focal spot, anode imbalance has no effect and there will be no resulting focal spot jitter. The results of these tests may then be subtracted to obtain measurements of the magnitude of the effects of anode imbalance and electromagnetic leakage from the rotor/stator. It is possible to have the processing means automatically subtract the results of these tests, as by programming software to compare the results of three film samples having the aforementioned rotor/stator conditions. This is made easier by using the feeding means noted above, i.e., strip film feeders or slide feeders, to allow the three film samples to be supplied to the apparatus in succession.

It is understood that preferred embodiments of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A method of analyzing the performance of X-ray tubes comprising:
    a. obtaining an image of the focal spot of a selected X-ray tube on a film sample when the selected X-ray tube includes an unpowered stator and a stationary anode;
    b. transforming the image into a processable electronic signal; and
    c. analyzing the electronic signal to determine parameters relating to at least one of the dimensions of the image, the shape of the image, and the optical density of the image.

2. The method of claim 1 further comprising the steps of:
    a. comparing the determined parameters to known parameter standards; and
    b. rejecting the selected X-ray tube where the determined parameters do not conform to the known parameter standards.

3. The method of claim 1 wherein the determined parameters comprise the line spread function, the modulation transfer function, the background optical density, and the peak optical density.

4. A method of analyzing the performance of X-ray tubes comprising:
    a. performing the method of claim 1 using a first film sample, thereby obtaining parameters for the first film sample;
    b. obtaining parameters for a second film sample by:
        (1) obtaining an image of the focal spot of the selected X-ray tube on the second film sample when the selected X-ray tube includes an unpowered stator and a coasting anode;
        (2) transforming the image into a processable electronic signal; and
        (3) analyzing the electronic signal to determine the parameters for the second film sample, the parameters relating to at least one of the dimensions of the image, the shape of the image, and the optical density of the image; and
    c. comparing the parameters for the first and second film samples to ascertain the effects of anode imbalance within the X-ray tube.

5. A method of analyzing the performance of X-ray tubes comprising:
    a. obtaining an image of the focal spot of a selected X-ray tube on a film sample when the selected X-ray tube includes an unpowered stator and a coasting anode;

b. transforming the image into a processable electronic signal; and c. analyzing the electronic signal to determine parameters relating to at least one of the dimensions of the image, the shape of the image, and the optical density of the image.

6. The method of claim 5 further comprising the steps of:

a. comparing the determined parameters to known parameter standards; and b. rejecting the selected X-ray tube where the determined parameters do not conform to the known parameter standards.

7. The method of claim 5 wherein the determined parameters comprise the line spread function, the modulation transfer function, the background optical density, and the peak optical density.

8. A method of analyzing the performance of X-ray tubes comprising:

a. obtaining parameters for a first film sample by:

(1) obtaining an image of the focal spot of a selected X-ray tube on the first film sample when the selected X-ray tube includes a powered stator and a rotating anode;

(2) transforming the image into a processable electronic signal; and (3) analyzing the electronic signal to determine the parameters for the first film sample, the parameters relating to at least one of the dimensions of the image, the shape of the image, and the optical density of the image;

b. performing the method of claim 5 using a second film sample, thereby obtaining parameters for the second film sample;

c. comparing the parameters for the first and second film samples to ascertain the effects of electromagnetic leakage within the X-ray tube.

* * * * *